United States Patent [19]

Wirth

[11] Patent Number: 5,171,640
[45] Date of Patent: Dec. 15, 1992

[54] MULTILAYER POLYMER MATERIALS WITH BARRIER PROPERTIES

[75] Inventor: Rene Wirth, Lens, France

[73] Assignee: Atochem, Puteaux, France

[21] Appl. No.: 618,035

[22] Filed: Nov. 26, 1990

[51] Int. Cl.$^5$ ............................................. B32B 27/32
[52] U.S. Cl. .................................. 428/515; 428/36.6;
428/36.7; 428/517; 428/519; 428/521; 428/522; 428/523
[58] Field of Search ............... 428/515, 517, 519, 520, 428/521, 522, 523, 36.6, 36.7

[56] References Cited

U.S. PATENT DOCUMENTS

| | | | |
|---|---|---|---|
| 4,254,169 | 3/1981 | Schroeder | 428/36.7 |
| 4,481,262 | 11/1984 | Shida et al. | 428/441 |
| 4,798,750 | 1/1989 | Kersting | 428/36.7 |

*Primary Examiner*—Paul J. Thibodeau
*Assistant Examiner*—D. S. Nakarani

[57] ABSTRACT

Multilayer polymer material with barrier properties containing a layer (a) of a polymer with barrier properties and a layer (b) of copolymer of styrene and maleic anhydride.

The polymer of layer (a) is a copolymer of ethylene and vinyl alcohol and the said material also has a layer (c) of a copolymer of ethylene containing units derived from an unsatured dicarboxylic acid anhydride and layer (c) is in contact with layer (a).

10 Claims, No Drawings

MULTILAYER POLYMER MATERIALS WITH BARRIER PROPERTIES

The present invention pertains to multilayer thermoplastic polymer materials that have barrier properties.

Attempts have been made to find thermoplastic polymers that have barrier properties in relation to liquids and gases, especially oxygen, for numerous applications, particularly in the food industry. These polymers are useful for the fabrication of packing materials or vessels (e.g., drinking glasses). Polymers that have barrier properties are known, e.g., the copolymers of ethylene and vinyl alcohol, the copolymers of methyl acrylate and acrylonitrile and the copolymers of ethylene and hydrolyzed vinyl acetate, but these polymers have poor mechanical properties. This has led to the preparation of multilayer material so as to reinforce the polymer that has barrier properties, but the greater the number of layers the more difficult is the preparation of these materials. For example, when they are prepared by extrusion, it is difficult to regulate the positions and flow rates of the different extruder heads. When they are prepared by hot compression molding on a hydraulic press, the positioning of the numerous homogeneous layers is costly and difficult.

It is already been proposed to prepare a polymer material with barrier properties comprised of three layers. For example, Canadian Patent 1,150,461 describes a material comprising:
- an inner layer of copolymer of styrene and maleic anhydride,
- an outer layer of copolymer of acrylonitrile and methyl acrylate and
- a middle layer of copolymer of ethylene and vinyl acetate.

The principal problem presented by the multilayer materials is that of their adhesion. It is necessary to prevent the different layers from delaminating during or immediately after fabrication of the material or after the material has been put into use.

The present invention pertains to a multilayer polymer material with barrier properties containing a layer (a) of a polymer with barrier properties and a layer (b) of copolymer of styrene and maleic anhydride characterized in that the polymer of layer (a) is a copolymer of ethylene and vinyl alcohol and in that the said material also has a layer (c) of a copolymer of ethylene containing units derived from an unsaturated dicarboxylic acid anhydride, and that layer (c) is in contact with layer (a).

In accordance with the present invention, the copolymer of layer (c) can be notably:
- a copolymer of ethylene and maleic anhydride obtained by radical copolymerization under high pressure or by grafting the maleic anhydride on the polyethylene,
- a terpolymer of ethylene, maleic anhydride and at least one alkyl acrylate, the alkyl group of which has from 2 to 6 carbon atoms, or
- a mixture of polyethylene and the aforementioned copolymer or terpolymer.

The multilayer polymer material in accordance with the invention can have the structure b-c-a or, preferably, b-a-c.

For certain applications, it can be advantageous that the multilayer polymer material in accordance with the invention have an additional layer (d) of polyethylene in contact with layer (c).

The applicant has found that in the multilayer polymer materials in accordance with the invention, the adhesion between the different layers is satisfactory for the usual applications of these materials. In particular, the adhesion between layers (a) and (c) is excellent. The material obtained also has good temperature resistance and good mechanical properties. It should also be noted that it is possible to increase the thickness of layer (a) in order to improve the barrier properties, while still preserving a reasonable thickness of the material.

The copolymer of ethylene and vinyl alcohol constituting layer (a) is preferably a copolymer containing between 30 and 50 mol-% of ethylene. In the finished product, it comprises a layer with a thickness that can range from circa 20 microns to 1.5 mm; the thicknesses close to 20 microns are preferably obtained by extrusion and the thicknesses close to 1.5 mm are preferably obtained by hot compression molding on a hydraulic press.

The copolymer of maleic anhydride and styrene constituting layer (b) preferably comprises 4 to 12% by weight of maleic anhydride and can, if necessary, be grafted on an unsaturated polyolefin elastomer such as a polybutadiene or an ethylene terpolymer with at least one $\alpha$-olefin having 3 to 6 carbon atoms and at least one diene (an example being notably a terpolymer comprising 15 to 60 mol-% of units derived from propylene and from 0.1 to 20 mol-% of units derived from the diene). The elastomer which is possibly present represents at most 20% be weight in relation to the styrene. The thickness of layer (b) in the finished product can range between circa 100 microns and 1.5 mm.

The copolymer of layer (c) preferably comprises circa 0.3 to 20 mol-% of maleic anhydride (and preferably no more than 3 mol-% in case of an ungrafted copolymer) and can also include, if required, from circa 1 to 15 mol-% of alkyl acrylate with the remainder being essentially comprised of ethylene. It preferably has a fluidity index (measured accorded to the standard ASTM-D 1238-73) between 1 and 50 dg/min. The thickness of layer (c) in the finished product can range between circa 20 microns and 1.5 mm.

In accordance with the invention, layer (c) can also be constituted of a mixture comprising at least 50% by weight of the copolymer of ethylene and maleic anhydride defined above and at most 50% by weight of polyethylene such as described notably in the European patent application published as Number 0,222,789. Such a mixture can be created by any known means such as a kneader, internal mixer or extruder.

The invention is illustrated by the nonlimitative examples presented below.

In the examples, the peeling force is the tensile force (measured in Newtons) required to disunite the interface of two joined layers from a multilayer test piece with dimensions equal to $130 \times 15 \times 1$ mm.

PREPARATION OF THE TEST PIECES

Granules of the products to be employed for creation of the test piece are introduced into the center of a 1-mm thick intercalation frame which is placed between the electrically heated platens ($40 \times 40$ cm) of an AUTOMACT 60-ton hydraulic press. Preheating of the granules to a temperature T is carried out for three minutes; a hydraulic machine pressure of 20 MPa is then applied to the granules for 3 minutes. Cooling is carried out on a supplementary press OLIER model 510 R under 10 MPa. One thereby obtains a test-piece sheet of dimensions corresponding to the volume left free by the intercalation frame, i.e., 300×300×1 mm.

One then cuts out of this test-piece sheet, using shears (or a saw for the test pieces of ethylene and vinyl alcohol copolymer), test pieces with the dimensions 130×15×1 mm.

The temperature T is equal to 220° C. for preparation of the test pieces of ethylene and vinyl alcohol copolymer and to 200° C. for preparation of all the other test pieces.

PREPARATION OF THE MULTILAYER SPECIMENS

The test pieces are joined along half of their length. This joining is effected by placing the test pieces in an intercalation frame the thickness of which is equal to the sum of the thicknesses of the individual test pieces. This frame is placed between the platens of the press that was used for preparation of the test pieces.

The platens of this press are brought to a temperature t specified in the examples below.

The specimens are subjected to a hydraulic machine pressure equal to 20 MPa. Polyester films are inserted on the other halves of the test piece lengths so as to prevent joining of two adjacent test pieces.

EXAMPLE 1

In accordance with the operating procedure described above, one prepares a specimen constituted of:

a) a layer of copolymer of ethylene and vinyl alcohol sold by MITSUI as EVAL EPF 104.

b) a layer of copolymer of styrene and maleic anhydride grafted on elastomer sold by ARCO as DYLARK 700.

c) a layer $c_1$ in contact with layer (a) constituted of a terpolymer comprising 91% by weight of ethylene, 6% by weight of ethyl acrylate and 3% by weight of maleic anhydride sold by NORSOLOR as LOTADER 3200 and having a fluidity index of 5 dg/min.

Table I below shows in relation to the temperature t, the thicknesses (expressed in microns) of the different layers of the specimen as well as the peeling forces (expressed in Newtons) $P_{ab}$ between layers (a) and (b) and $P_{ac}$ between layers (a) and ($c_1$).

TABLE I

| t | (a) | (b) | (c) | $P_{ab}$ | $P_{ac}$ |
| --- | --- | --- | --- | --- | --- |
| 200 | 300 | 900 | 100 | n.d. | 29.4 |
| 220 | 200 | 800 | 70 | 5.89 | 22.6 |
| 240 | 150 | 700 | 40 | n.d. | 23.5 | n.d. = not determined

EXAMPLE 2

One prepares a multilayer specimen constituted of:

two layers (a) and (b) of composition identical to those of Example 1, and a layer ($c_2$) of a grafted copolymer of ethylene and maleic anhydride sold by MITSUI as ADMER L 200.

Table II below shows in relation to the temperature t, the thicknesses (expressed in microns) of the different layers as well as the peeling forces (expressed in Newtons) $P_{ac}$ between layers (a) and ($c_2$).

TABLE II

| t | (a) | (b) | (c) | $P_{ac}$ |
| --- | --- | --- | --- | --- |
| 200 | 300 | 900 | 100 | 21.6 |
| 220 | 200 | 800 | 70 | 44.2 |

TABLE II-continued

| t | (a) | (b) | (c) | $P_{ac}$ |
| --- | --- | --- | --- | --- |
| 240 | 150 | 700 | 50 | 46.1 |

EXAMPLE 3

One prepares a multilayer specimen with:

two layers (a) and (b) of composition identical to those of Example 1, and a layer ($c_3$) of a copolymer comprising 97% by weight of ethylene and 3% by weight of maleic anhydride prepared by a radical procedure.

a layer (d) of low radical density polyethylene sold by NORSOLOR as LOTRENE MA 0701.

Table III below shows in relation to the temperature t, the thicknesses (expressed in microns) of the layers and the peeling forces (expressed in Newtons) $P_{ac}$ between layers (a) and ($c_3$) and $P_{dc}$ between layers (d) and ($c_3$).

TABLE III

| t | (a) | (b) | (c) | $P_{ac}$ | $P_{dc}$ |
| --- | --- | --- | --- | --- | --- |
| 220 | 200 | 800 | 70 | 17.7 | 19.6 |
| 240 | 150 | 700 | 40 | 41.2 | n.d. | n.d. = not determined

EXAMPLE 4

One prepares a sample comprising:

two layers (a) and (b) of composition identical to those of Example 1, with the respective thicknesses of 200 microns and 800 microns.

a 70-micron thick layer ($c_4$) of a mixture constituted of 25% by weight of the low-density polyethylene mentioned in Example 3 and 75% by weight of the copolymer of ethylene and maleic anhydride used in Example 3.

The peeling force between layers (a) and ($c_4$) was 33.4N at 220° C.

EXAMPLE 5 (COMPARATIVE)

One prepares a specimen with:

two layers (a) and (b) of composition identical to those of Example 1.

a layer ($c_5$) constituted of the low-density polyethylene mentioned in Example 3.

Table IV below shows in relation to the temperature t, the thicknesses (expressed in microns) of the different layers and the peeling forces $P_{ac}$ between layers (a) and ($c_5$) and $P_{ab}$ between layers (a) and (b).

TABLE IV

| t | (a) | (b) | (c) | $P_{ac}$ | $P_{ab}$ |
| --- | --- | --- | --- | --- | --- |
| 200 | 300 | 900 | 100 | 1.96 | n.d. |
| 220 | 200 | 800 | 70 | n.d. | 5.89 | n.d. = not determined

EXAMPLE 6 (COMPARATIVE)

One prepares a multilayer specimen comprising:

two layers (a) and (b) of composition identical to those of Example 1, with respective thicknesses of 200 microns and 800 microns, a 70-micron thick layer ($c_6$) constituted of a copolymer comprising 72% by weight of ethylene and 28% by weight of vinyl acetate.

The peeling force between layers (a) and (c$_6$) was 12.8N at 220° C.

I claim:

1. Multilayer polymer material with barrier properties consisting of a layer (a) of a polymer with barrier properties and a layer (b) of a copolymer of styrene and maleic anhydride, wherein the polymer of layer (a) is a copolymer of ethylene and vinyl alcohol and wherein the said material also has a layer (c) of a copolymer of ethylene containing units derived from an unsaturated dicarboxylic acid anhydride and that layer (c) is in contact with layer (a).

2. Material in accordance with claim 1, wherein the copolymer of layer (c) is a copolymer of ethylene and maleic anhydride.

3. Material in accordance with claim 2, wherein the said copolymer is a grafted copolymer comprising 0.3 to 20 mol-% of maleic anhydride.

4. Material in accordance with claim 2, wherein the said copolymer comprises 0.3 to 3 mol-% of maleic anhydride.

5. Material in accordance with claim 4, wherein the said copolymer also comprises at least one alkyl acrylate, the alkyl group of which has 2 to 6 carbon atoms.

6. Material in accordance with claim 5, wherein the said copolymer comprises from 1 to 15 mol-% of alkyl acrylate.

7. Material in accordance with any one of claims 1 to 6, wherein it has a b-a-c structure.

8. Material in accordance with any one of claims 1 to 6, wherein the thickness of layer (c) is between 20 $\mu$m and 1.5 mm.

9. Material in accordance with claim 2, wherein the copolymer of ethylene and maleic anhydride is in a mixture with polyethylene.

10. Material in accordance with any one of claims 1 to 6 and 9, wherein it also has another layer (d) of polyethylene in contact with layer (c).

* * * * *

UNITED STATES PATENT AND TRADEMARK OFFICE
CERTIFICATE OF CORRECTION

PATENT NO. : 5,171,640

DATED : December 15, 1992

INVENTOR(S) : Rene Wirth

It is certified that error appears in the above-identified patent and that said Letters Patent is hereby corrected as shown below:

On the title page: Item [56]

Related Foreign/PCT Application Data

June 30, 1989                PCT/FR89/00341
June 30, 1988   France       88 08856

Signed and Sealed this

Twenty-second Day of June, 1993

Attest:

MICHAEL K. KIRK

*Attesting Officer*        *Acting Commissioner of Patents and Trademarks*